No. 811,318. PATENTED JAN. 30, 1906.
F. H. NILES.
DOUBLE PIPE RETURN BEND.
APPLICATION FILED AUG. 1, 1904.

Witnesses:
Walter Schalck.
Lillian Prentice.

Inventor:
Francis H. Niles
By Peirce & Fisher
Attorneys.

UNITED STATES PATENT OFFICE.

FRANCIS H. NILES, OF CHICAGO, ILLINOIS, ASSIGNOR TO FEATHERSTONE FOUNDRY AND MACHINE COMPANY, OF CHICAGO, ILLINOIS, A CORPORATION.

DOUBLE-PIPE RETURN-BEND.

No. 811,318. Specification of Letters Patent. Patented Jan. 30, 1906.

Application filed August 1, 1904. Serial No. 219,056.

*To all whom it may concern:*

Be it known that I, FRANCIS H. NILES, a citizen of the United States, and a resident of Chicago, county of Cook, and State of Illinois, have invented certain new and useful Improvements in Double-Pipe Return-Bends, of which the following is declared to be a full, clear, and exact description.

The invention relates to return-bends for connecting the separate sections of a double-pipe coil, such as are commonly employed in ice-making or refrigerating machinery, for condensing or cooling coils, and for other purposes. Such coils are formed of a continuous inner pipe, through which passes the water or brine, and a continuous outer pipe, through which the ammonia-gas passes. The double return-bends for connecting the separate sections must be securely constructed and nicely fitted to avoid leakage and so arranged that they may be conveniently removed for the renewal of packing and the like.

The object of the present invention is to provide a simple, strong, double-pipe return connection of few parts and which can be securely packed against leakage; and the invention consists in the features of construction and arrangement of parts hereinafter set forth, illustrated in the accompanying drawings, and more particularly pointed out in the appended claim.

Figure 1:
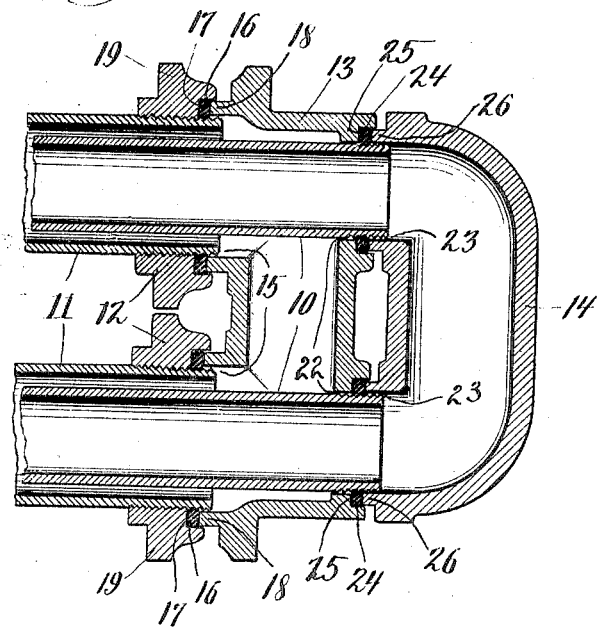
Figure 3:
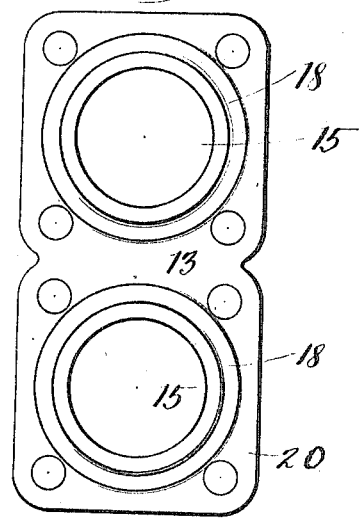
Figure 2:
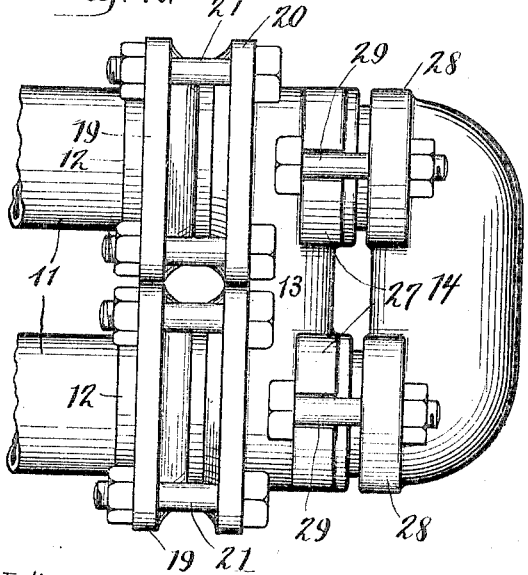
Figure 4:
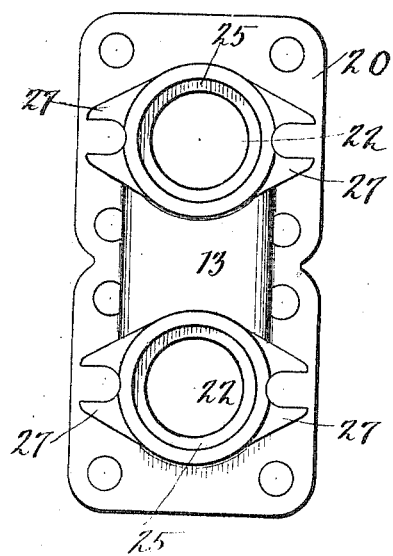

In the drawings, Figure 1 is a longitudinal section through the improved double-pipe return-bend. Fig. 2 is an elevation thereof. Fig. 3 is a view of the inner face of the inner bend, and Fig. 4 is a view of the outer face of the same.

The straight inner and outer pipe-sections 10 and 11 of the coil are successively connected at their ends by the improved return-bend. The ends only of these straight pipe-sections are shown in the drawings.

The double-pipe return connection comprises the collars 12, the inner return-bend 13, and the outer return-bend 14. The parts are thus few in number and the connection is of simple construction. The use of additional stuffing-boxes are avoided, the joints being formed directly between the parts of the connection. The collars 12 are rigidly secured to the outer pipe-sections 11 adjacent their ends and in such a manner as to form a tight joint. Preferably the bore of each collar is threaded from end to end and engages the correspondingly-threaded ends of the outer pipes 11. The inner bend 13 connects the outer pipes 11 and is provided on its inner face with openings 15, within which the ends of these outer pipes extend. The openings are not threaded, but fit about the threaded ends of the pipes 11.

Packing-rings 16 are held in place about the pipes 11 between the collars 12 and the bend 13. The packing-rings are preferably formed of rubber, having a stiffening-backing of canvas, and are arranged within annular recesses 17, formed in the collars. Coöperating annular flanges 18, formed about the openings 15 in the bend, engage the packing-rings 16 and when the bend and collars are secured together jam the rings within the recesses 17 and hold them snugly against the outer face of the pipe-sections 11, forming a tight joint. The pipe-sections are threaded at this point, and the packing-rings are forced into the threads, so as to assist in rendering the joint perfectly tight. Each collar is provided with a square flange 19, having bolt-holes at the corners, and the bend 13 is provided with an oblong flange 20, having bolt-holes corresponding with those of flanges 19. Bolts 21, extending between the flanges 19 and 20, securely hold the inner bend 13 in position and force the packing-rings snugly within their seats and against the outer pipes 11.

The ends of the inner pipe-sections 10 project beyond the ends of the outer pipes 11, and the outer portion of the inner bend 13 is provided with openings 22, fitted about the ends of these inner pipes. The outer bend 14 connects the inner pipe-sections and is provided with openings 23, fitted about the ends thereof. Packing-rings 24, of rubber, strengthened with a canvas backing, are held in place about the ends of the inner pipe-sections 10 and between the inner and outer bends 13 and 14. Annular recesses 25 in the outer face of the inner bend 13 and about the openings 22 receive the packing-rings, and coöperating flanges 26 on the outer bend 14 about the openings 23 serve to force the rings snugly within the recesses 25 and against the outer face of the pipe-sections 10.

The outer portion of bend 13 is provided with slotted lugs 27 opposite each joint, and the outer bend 14 has corresponding perforated lugs 28. Bolts 29, extending between lugs 27 and 28, securely hold the outer bend 14 in place and compress the packing-rings 24 within their seats and against the ends of the inner pipe-sections 10 to form a tight joint. The ends of the inner pipes 10 are not screwed into either of the bends 13 and 14, but are preferably threaded, as shown, so that the packing-rings 24 may be forced into the threads to assist in providing a tight joint.

The packing-rings 16 and 24 are formed of compressible material and, as stated, preferably of soft rubber, so that tight joints may be easily formed by sufficiently compressing the rings. The joint thus formed is simple in construction, easily placed in position, and kept in good repair.

Having described my invention, what I claim as new, and desire to secure by Letters Patent, is—

A double-pipe return-bend comprising the inner and outer pipe-sections, collars threaded to said outer pipes, an inner bend connecting said outer pipes fitted about the same at its inner portion and fitted about said inner pipes at its outer portion, an outer bend fitted about the ends of said inner pipes, packing-rings about said outer pipes, annular recesses in said collars for receiving said packing-rings, flanges on said inner bend extending within said recesses and holding said packing-rings in place against said outer pipes, annular recesses in said inner bend about the ends of said inner pipes, packing-rings in said recesses, coöperating flanges on said outer bend engaging said packing-rings and holding the same in place against said inner pipes, said outer and inner pipes having threaded portions engaged by said packing-rings, bolts connecting said bends and separate bolts connecting said inner bends and said collars, said bolts being arranged to draw said bends and collars together to compress the packing-rings, substantially as described.

FRANCIS H. NILES.

Witnesses:
   IRVING G. BROWN,
   J. F. DILLON.